Figure 1:
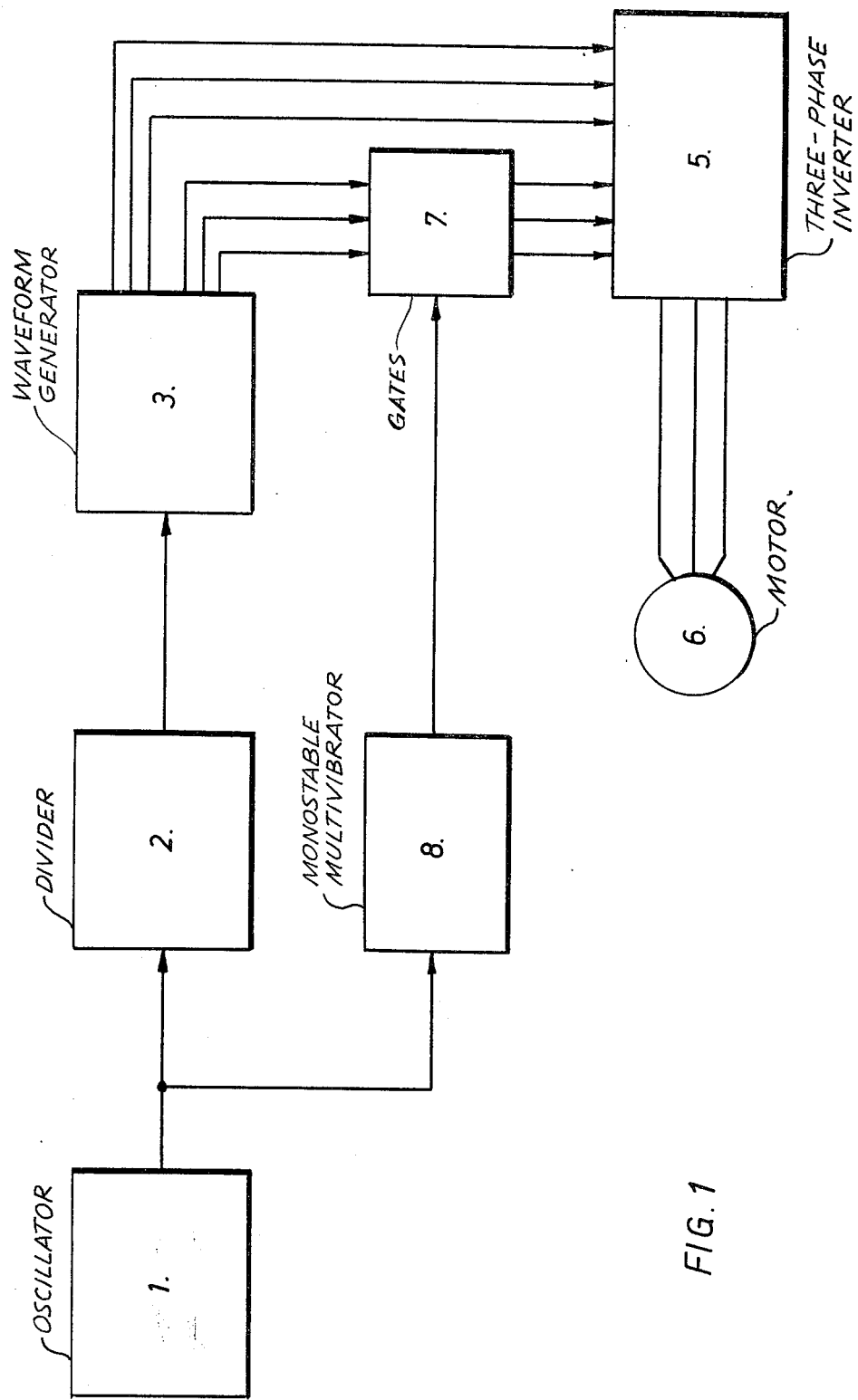

United States Patent [19]
Carthy

[11] 3,978,383
[45] Aug. 31, 1976

[54] SPEED CONTROLS FOR ELECTRIC MOTORS

[75] Inventor: Terence George Carthy, Macclesfield, England

[73] Assignee: Scragg Power Drives Limited, England

[22] Filed: Dec. 10, 1974

[21] Appl. No.: 531,437

[30] Foreign Application Priority Data
Dec. 19, 1973 United Kingdom............... 58740/73

[52] U.S. Cl............................... 318/227; 318/230; 318/231
[51] Int. Cl.²........................................... H02P 5/40
[58] Field of Search..................... 318/227, 230, 231

[56] References Cited
UNITED STATES PATENTS

| | | | |
|---|---|---|---|
| 3,392,316 | 7/1968 | Salihi................................... | 318/227 |
| 3,406,325 | 10/1968 | Rosa................................. | 318/227 X |
| 3,423,662 | 1/1969 | Schlabach et al............... | 318/227 X |
| 3,569,805 | 3/1971 | Hammond.......................... | 318/227 |
| 3,611,086 | 10/1971 | Mokrytzki........................... | 318/227 |

*Primary Examiner*—Gene Z. Rubinson
*Attorney, Agent, or Firm*—Larson, Taylor and Hinds

[57] ABSTRACT

A digital speed control system for an induction motor comprising means producing pulses proportional in frequency to desired motor speed connected to motor speed setting means that generate a series of waveforms to selectively switch an inverter to produce an induction motor power supply, said motor speed pulse producing means also being connected to motor voltage control means that modulates the output of the motor speed setting means such that the output voltage of the inverter is directly proportional to the frequency of the induction motor power supply.

2 Claims, 4 Drawing Figures

SPEED CONTROLS FOR ELECTRIC MOTORS

DESCRIPTION

This invention relates to speed control systems for induction motors and is particularly, but not exclusively, applied to the control of squirrel-cage motors.

It is known to obtain good control of induction motors by arranging for the voltage and the frequency of the motor's power supply to vary together in an approximately linear fashion so that the r.m.s. voltage applied to the motor should be directly proportional to the frequency of the applied voltage. This relationship gives an approximately constant torque output from an induction motor over a wide speed range.

The present invention seeks to provide such a voltage to frequency law from a digital control system supplied with a pulsed input signal for desired motor speed. Such a digital control system can overcome the drift problems encountered in analogue control systems, the frequency of the power supply being as accurate as the pulses of the input signal.

According to the present invention, a digital speed control system for an induction motor comprises:

i. means to produce a pulsed input signal proportional in frequency to desired motor speed;

ii. motor speed setting means, connected to the output of said motor speed pulse producing means, for generating an output series of pulse train waveforms directly proportional in frequency to said pulsed input signal and suitable for selectively switching an inverter to produce an induction motor power supply; and iii. motor voltage control means, connected to the output of said motor speed pulse producing means, and including gate means connected to the output of said motor speed setting means to modulate said pulse train waveforms such that the output voltage of the inverter is controlled to be directly proportional to the frequency of said pulsed input signal and hence to the frequency of the induction motor power supply.

Figures 2, 3:
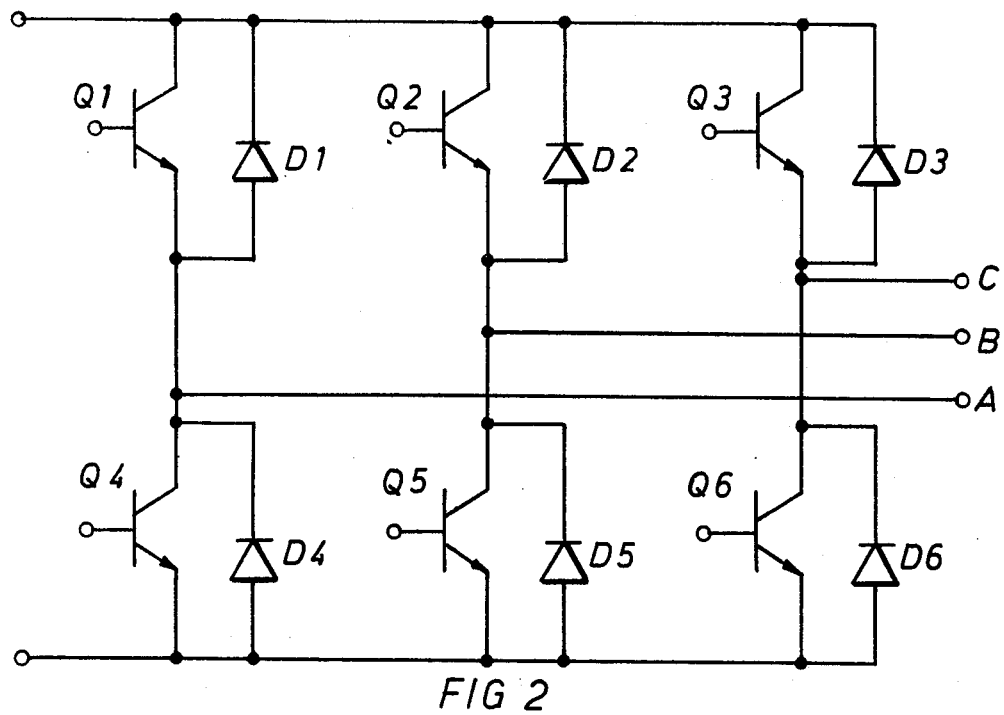
Figure 4:
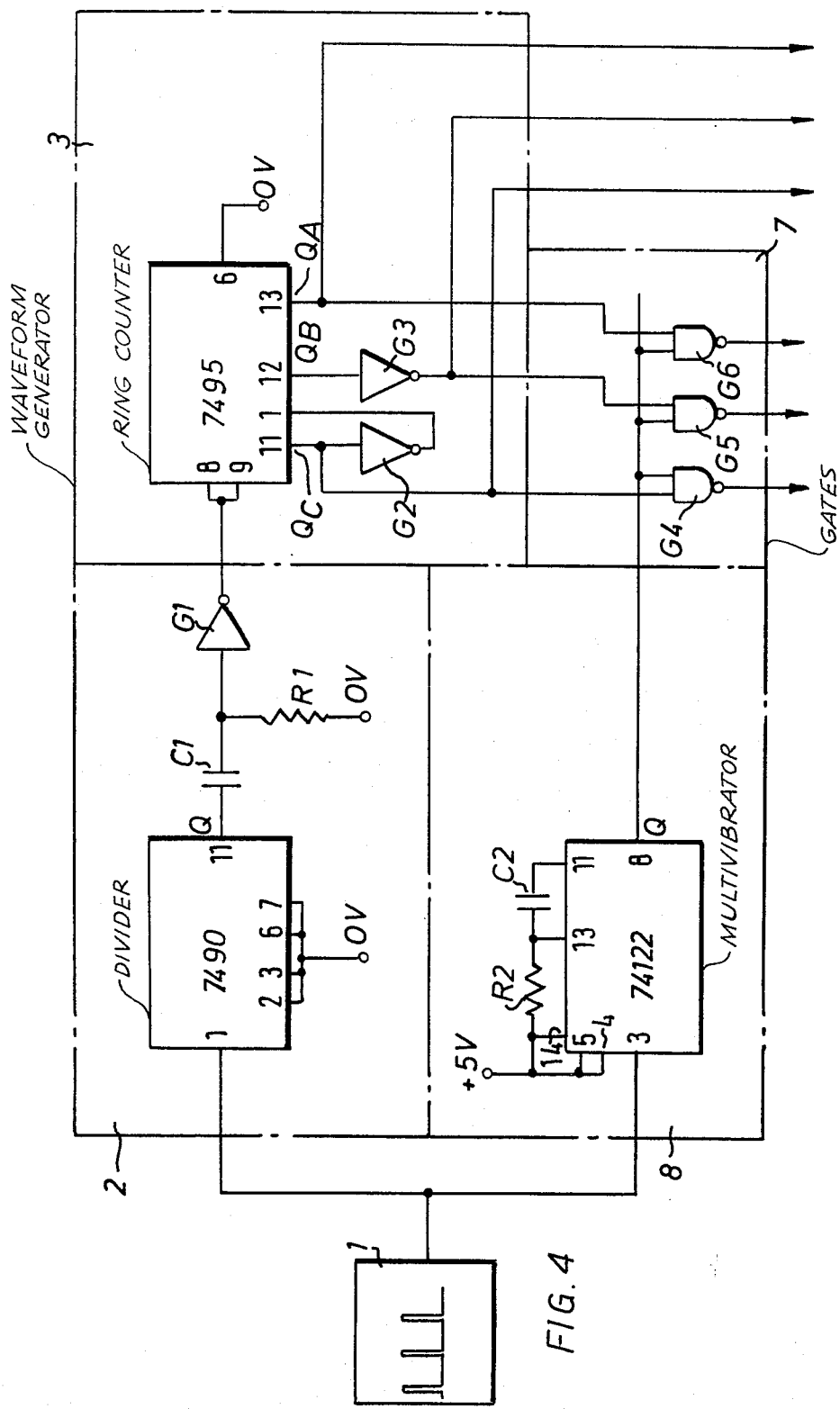

The invention is illustrated, by way of example, on the accompanying drawings, in which:

FIG. 1 is a schematic diagram of a digital speed control system for a three-phase induction motor in accordance with the invention, FIG. 2 is a simplified circuit diagram of a three-phase transistorised inverter, FIG. 3 is a table of inverter transistor switching sequences, and FIG. 4 is a more detailed schematic diagram of a digital speed control system.

As shown by FIG. 1, the digital speed control system has an oscillator 1 producing a series of pulses, the frequency of which is proportional to desired motor speed.

This series of pulses acts as an input signal to both a motor speed setting means and a motor voltage control means.

The motor speed setting means has a divider 2 which divides the input signal by $n$ times. The output of the divider 2 is used to drive a three-stage ring counter and waveform generator 3 which generates six pulse train waveforms each having a pulse width of 180° and a pulse spacing of 180°, the pulses of each of the waveforms being phase-displaced by 60° with respect to those of the preceding waveform. The waveforms are used to switch a three-phase inverter 5 which powers a squirrel-cage motor 6.

The motor voltage control means operates to control the voltage of the inverter output by modulating three of the pulse train waveforms from generator 3. The control means includes three mixing gates 7 interposed between three of the outputs of generators 3 and the respective inputs to inverter 5. A monostable multivibrator 8 is connected to the output of oscillator 1 and generates a pulse of fixed duration for each pulse of the input signal. The fixed duration pulse is employed as a modulating input to the gates 7.

If the fixed duration of this modulation pulse is t secs, the period of the input signals is T secs, the dividing factor of divider 2 is $n$ and the maximum output voltage of the inverter 5 (at full modulation) is Vm, then the actual output voltage Vo of inverter 5 is given by Vo = Vm.t/T.

The generator 3 is an effective divide by six stage, therefore the output frequency Fo of the inverter 5 is given by Fo = 1/6.n.T. and hence Vo = V.m.t.6.n.Fo. As Vm, t and 6n are constants for any given control system it will be seen that the output voltage Vo of inverter 5 is directly proportional to the output frequency Fo, i.e. Vo = K Fo.

This analysis is equally valid for single- or polyphase inverters, the only differences being in the designs of ring-counter and waveform generator 3.

A circuit for a suitable inverter is shown by FIG. 2 to comprise six power transistors Q1 to Q6 arranged in a bridge circuit. The transistors are switched by the pulse train waveform from generator 3, the waveforms modulated by gates 7 being applied to the bases of transistors Q1, Q2 and Q3. Owing to the 60° phase-displacement between the waveforms a three-phase alternating power supply is synthesised between the three outputs A, B and C of the inverter. When transistor Q1 is turned on, transistor Q5 is already on but is turned off two-thirds of the way through the 180° "on" period of transistor Q1, transistor Q6 being turned on. Similarly, transistors Q6 and Q4 turn off and on respectively during the on period for transistor Q2 and transistors Q4 and Q5 during the on period for transistor Q3, as shown by the table of FIG. 3. Diodes D1 to D6 are provided in parallel with transistors Q1 to Q6 respectively, to pass back e.m.f's developed across each transistor during its "off" periods by the induction load of motor 6.

In the more detailed schematic diagram of FIG. 4, a variable rate pulse generator 1 is connected to the input of a divider 2. This divider consists of an integrated circuit No. 7490 (Texas Instruments type SN 7490N) that is connected as a divide by five stage. The output of integrated circuit No. 7490 is connected to a gate G1 (Texas Instruments type SN 7404N) via a capacitor $C_1$ with a resistor $R_1$ to ground; capacitor $C_1$ and resistor $R_1$ constitute a differentiating circuit which acts in conjunction with gate $G_1$ to form a clock pulse for the output of divider 2.

The ring counter and waveform generator 3 is formed by an integrated circuit No. 7495 (Texas Instruments type SN 7495N) interconnected as shown with two gates $G_2$ and $G_3$ (both Texas Instruments type SN 7404N) to make a ring counter with a full count cycle of six.

The monostable multivibrator 8 is an integrated circuit No. 74122 (Texas Instrument type SN 74122N) giving a fixed output pulse width at the Q output for each input pulse at pin 3. A resistor $R_2$ and a capacitor $C_2$ are connected as shown about integrated circuit No.

74122 to control the width of the output pulse from output Q, the width being directly proportional to the product of the values of resistor $R_2$ and capacitor $C_2$.

The three mixing gates 7, gates $G_4$, $G_5$ and $G_6$ (all Texas Instruments type SN 7400N) are modulated by the pulse from the Q output.

I claim:

1. A digital speed control system for an induction motor comprising
   i. means for producing a pulsed input signal proportional in frequency to the desired motor speed;
   ii. a motor speed setting means, connected to the output of said motor speed pulse producing means, and including means for dividing the number of pulses from said motor speed pulse producing means by a constant factor and a ring counter, connected to be driven by said dividing means, for generating a series of pulse train waveforms for selectively switching an inverter to produce an induction motor power supply; and
   iii. motor voltage control means, connected to the output of said motor speed pulse producing means, and including a monostable multivibrator for generating a fixed duration output pulse for each input pulse from said motor speed pulse producing means, and a plurality of mixing gates, modulated responsive to said fixed duration pulses, connected to the outputs of one-half only of the outputs of said ring counter such that the output voltage of the inverter is controlled to be directly proportional to the frequency of said pulsed input signal and hence to the frequency of the motor power supply.

2. A system as defined in claim 1, wherein said ring counter comprises a three-stage ring counter which generates a series of six pulse train waveforms each having a pulse width of 180° and a pulse spacing of 180°, the pulses of each of the waveforms being phase displaced by 60° with respect to those of the preceding waveform and said fixed duration pulses being employed to modulate three mixing gates at the outputs of three only of the six outputs of said ring counter.

* * * * *